(12) United States Patent  
Thompson

(10) Patent No.: US 11,116,611 B1  
(45) Date of Patent: Sep. 14, 2021

(54) PROCESS AND SYSTEMS FOR MOLDING THERMOSETTING PLASTICS

(71) Applicant: Timothy Thompson, Fountain Hills, AZ (US)

(72) Inventor: Timothy Thompson, Fountain Hills, AZ (US)

(73) Assignee: Global Dental Science, LLC, Scottsdale, AZ (US)

( * ) Notice: Subject to any disclaimer, the term of this patent is extended or adjusted under 35 U.S.C. 154(b) by 0 days.

(21) Appl. No.: 15/152,521

(22) Filed: May 11, 2016

Related U.S. Application Data

(62) Division of application No. 13/369,238, filed on Feb. 8, 2012, now Pat. No. 9,364,302.

(51) Int. Cl.
| | |
|---|---|
| *B29C 43/20* | (2006.01) |
| *A61C 13/20* | (2006.01) |
| *A61C 13/00* | (2006.01) |
| *B29C 43/10* | (2006.01) |
| *B29C 43/00* | (2006.01) |
| *B29K 33/00* | (2006.01) |
| *B29K 101/10* | (2006.01) |
| *B29L 31/00* | (2006.01) |

(52) U.S. Cl.
CPC .......... *A61C 13/20* (2013.01); *A61C 13/0022* (2013.01); *B29C 43/003* (2013.01); *B29C 43/10* (2013.01); *B29K 2033/08* (2013.01); *B29K 2101/10* (2013.01); *B29L 2031/753* (2013.01)

(58) Field of Classification Search
CPC ... B29C 35/002; B29C 35/02; B29C 35/0288; B29C 43/10; B29C 67/0037; B29K 2033/08; B30B 11/001; B30B 11/002

USPC .......................................................... 425/2  
See application file for complete search history.

(56) References Cited

U.S. PATENT DOCUMENTS

| | | |
|---|---|---|
| 830,887 A | 9/1906 | Robert |
| 2,398,671 A | 4/1946 | Saffir |
| 2,514,076 A | 7/1950 | Kelly |
| 2,602,997 A | 7/1952 | Clawson |
| 3,126,429 A | 3/1964 | Saffir |

(Continued)

FOREIGN PATENT DOCUMENTS

| | | |
|---|---|---|
| CN | 1750797 | 3/2006 |
| EP | 1062916 | 12/2000 |

(Continued)

OTHER PUBLICATIONS

Positioning handle and occlusal locks for the Teeth-in-a-Day protocol:, The Journal of Prosthetic Dentistry, 2016, Baishi et al., p. 274-278.

(Continued)

*Primary Examiner* — Jeffrey M Wollschlager  
*Assistant Examiner* — Xue H Liu  
(74) *Attorney, Agent, or Firm* — Derrick Harvey

(57) ABSTRACT

Process and systems for molding or forming products from thermosetting plastics. The system utilizes a deformable container that is placed within the cavity of the housing of the mold with the resins and initiator mixed therein. As a piston slides into the cavity, the upper edges of the container engage between the housing and the piston to seal the housing form leakage. The pressure of the piston along with heat on the housing enable the curing process to be controlled to minimize shrinkage and porosity.

16 Claims, 4 Drawing Sheets

(56) References Cited

U.S. PATENT DOCUMENTS

| | | | |
|---|---|---|---|
| 3,335,495 A | 8/1967 | Theodore | |
| 3,458,936 A | 8/1969 | Tuccillo et al. | |
| 3,518,761 A | 7/1970 | Susman et al. | |
| 3,670,614 A | 6/1972 | Streckert | |
| 3,702,027 A | 11/1972 | Marshall et al. | |
| 3,839,796 A | 10/1974 | Hazar | |
| 3,844,702 A * | 10/1974 | Dimmer | A61C 13/20 425/425 |
| 3,846,911 A | 11/1974 | Wichner | |
| 3,908,272 A | 9/1975 | Arnold | |
| 3,937,773 A | 2/1976 | Huffman | |
| 3,987,546 A | 6/1976 | Trampe | |
| 4,115,488 A | 9/1978 | Colpitts | |
| 4,398,884 A | 8/1983 | Huffman | |
| 4,575,340 A | 3/1986 | Lustig | |
| 5,030,102 A | 7/1991 | Lang | |
| 5,043,199 A * | 8/1991 | Kubota | B29B 11/04 257/E21.504 |
| 5,169,309 A | 12/1992 | Staubli et al. | |
| 5,234,339 A | 8/1993 | Grigereit | |
| 5,452,219 A | 9/1995 | Dehoff et al. | |
| 5,676,546 A | 10/1997 | Heitmann et al. | |
| 5,730,825 A * | 3/1998 | Atake | B29C 45/14827 156/246 |
| 5,775,899 A | 7/1998 | Huffman | |
| 5,885,078 A | 3/1999 | Cagna et al. | |
| 5,934,906 A | 8/1999 | Phimmasone | |
| 5,985,170 A | 11/1999 | Inaba et al. | |
| 6,030,218 A | 2/2000 | Robinson | |
| 6,116,070 A | 9/2000 | Oshida | |
| 6,126,445 A | 10/2000 | Willoughby | |
| 6,257,895 B1 | 7/2001 | Oestreich | |
| 6,788,986 B1 | 9/2004 | Traber et al. | |
| 6,814,575 B2 | 11/2004 | Poirier | |
| 7,530,810 B2 | 5/2009 | Clement | |
| 7,653,455 B2 | 1/2010 | Cinader et al. | |
| 7,704,076 B2 | 4/2010 | Mullaly | |
| 7,758,346 B1 | 7/2010 | Letcher | |
| 7,806,691 B2 | 10/2010 | Berger | |
| 7,854,611 B2 | 12/2010 | Yau et al. | |
| 7,901,209 B2 | 3/2011 | Saliger et al. | |
| 7,909,607 B2 | 3/2011 | Yau et al. | |
| 7,943,068 B2 | 5/2011 | Panzera | |
| 7,950,924 B2 | 5/2011 | Brajnovic | |
| 9,155,599 B2 | 10/2015 | Thompson et al. | |
| 9,192,456 B2 | 11/2015 | Howe | |
| 9,213,784 B2 | 12/2015 | Thompson et al. | |
| 9,364,302 B2 | 6/2016 | Thompson et al. | |
| 9,402,698 B2 | 8/2016 | Thompson et al. | |
| 9,468,509 B2 | 10/2016 | Howe | |
| 9,492,252 B2 | 11/2016 | Howe | |
| 9,610,145 B2 | 4/2017 | Howe | |
| 9,662,189 B2 | 5/2017 | McDermott | |
| 9,717,572 B2 | 8/2017 | Thompson et al. | |
| 9,744,010 B2 | 8/2017 | Thompson et al. | |
| 9,867,684 B2 | 1/2018 | Grobbee et al. | |
| 10,206,764 B2 | 2/2019 | Grobbee et al. | |
| 10,251,733 B2 | 4/2019 | Grobbee | |
| 2003/0138756 A1 | 7/2003 | Monkmeyer | |
| 2004/0185422 A1 | 9/2004 | Orth et al. | |
| 2007/0009852 A1 | 1/2007 | Childress | |
| 2007/0170492 A1 | 8/2007 | Schmitt | |
| 2007/0190488 A1 | 8/2007 | Rusler | |
| 2008/0228303 A1 | 9/2008 | Schmitt | |
| 2009/0026643 A1 | 1/2009 | Wiest et al. | |
| 2009/0051618 A1 | 3/2009 | Lamar | |
| 2009/0143609 A1 | 6/2009 | Araya | |
| 2009/0181346 A1 | 7/2009 | Orth | |
| 2009/0220916 A1 | 9/2009 | Fisker et al. | |
| 2012/0094253 A1 | 4/2012 | Berger | |
| 2012/0315601 A1 | 12/2012 | Shchori | |
| 2013/0071801 A1 | 3/2013 | Lanfried | |
| 2013/0101962 A1 | 4/2013 | Howe | |
| 2013/0224932 A1 | 9/2013 | Thompson et al. | |
| 2013/0337412 A1 | 12/2013 | Kwon | |
| 2014/0051037 A1 | 2/2014 | Fisker | |
| 2014/0080094 A1 | 3/2014 | Howe | |
| 2014/0099600 A1 | 4/2014 | Harrison | |
| 2014/0234802 A1 | 8/2014 | Howe | |
| 2014/0272777 A1 | 9/2014 | Howe | |
| 2014/0272798 A1 | 9/2014 | McDermott | |
| 2014/0272800 A1 | 9/2014 | Howe | |
| 2015/0111177 A1 | 4/2015 | Fisker et al. | |
| 2015/0182316 A1 | 7/2015 | Morales et al. | |
| 2015/0230891 A1 | 8/2015 | Grobbee et al. | |
| 2015/0327961 A1 | 11/2015 | Thompson et al. | |
| 2016/0089221 A1 | 3/2016 | Christen et al. | |
| 2017/0014212 A1 | 1/2017 | Fischer | |
| 2017/0112599 A1 | 4/2017 | Balshi | |
| 2017/0325920 A1 | 11/2017 | Ginsburg et al. | |
| 2018/0116771 A1 | 5/2018 | Keating et al. | |

FOREIGN PATENT DOCUMENTS

| | | |
|---|---|---|
| EP | 1252867 | 10/2002 |
| EP | 2915503 | 7/2016 |
| EP | 3348228 | 7/2018 |
| FR | 2035133 | 12/1970 |
| WO | WO1991007141 | 5/1991 |
| WO | WO2015031062 | 8/1999 |
| WO | WO2003024352 | 3/2003 |
| WO | WO2004060197 | 7/2004 |
| WO | WO2010022479 | 3/2010 |
| WO | WO2012030493 | 3/2012 |
| WO | WO2014159436 | 10/2014 |

OTHER PUBLICATIONS

"A New Protocol for Immediate Functional Loading of Dental Implants", Dentistry Today, Balshi et al., Sep. 2001 vol. 20, No. 9.

"CAD and CAM—possibilities of optimization in total prosthetics (I)", Quintessenz: Becker, Apr. 1991, Issue 4, p. 397 to 404.

"Geroprosthetics; Age-appropriate prosthesis design with heart and mind," ZTM AKTUELL, Maas, Jul. 2010.

N. Savic, PalaDigtal.com, "My Digital Denture," Supplement to Inside Dental Technology magazine, Aegis Communications, Mar. 2017.

AvaDent product Information printed on May 15, 2017 from Avadent website; posting date unknown.

Morales et al., "A Digital spin on Traditional Dentures," Chairside Magazine, vol. 11, Issue 4, Glidewell Laboratories, Mar. 27, 2017.

U.S. Appl. No. 12/939,138—Advisory Action dated Nov. 23, 2015.

U.S. Appl. No. 12/939,138—Notice of Allowance dated Mar. 14, 2016.

U.S. Appl. No. 12/939,141—Restriction Requirement dated Apr. 9, 2015.

U.S. Appl. No. 12/939,141—Non-Final Office Action dated Jul. 12, 2016.

U.S. Appl. No. 12/939,141—Final Office Action dated Oct. 5, 2017.

U.S. Appl. No. 13/830,963—Final Office Action dated Feb. 23, 2016.

U.S. Appl. No. 13/830,963—Notice of Allowance dated Oct. 18, 2017.

U.S. Appl. No. 14/195,348—Non-Final Office Action dated Dec. 19, 2014.

U.S. Appl. No. 14/195,348—Final Office Action dated Apr. 18, 2016.

U.S. Appl. No. 14/195,348—Non-Find Office Action dated Dec. 30, 2016.

U.S. Appl. No. 14/195,348—Final Office Action dated Aug. 18, 2017.

U.S. Appl. No. 14/195,348—Notice of Allowance dated Nov. 30, 2018.

U.S. Appl. No. 14/195,348—Notice of Allowance dated Jan. 18, 2019.

U.S. Appl. No. 14/506,338—Non-Final Office Action dated Apr. 7, 2017.

U.S. Appl. No. 14/506,338—Notice of Allowance dated Oct. 17, 2018.

(56) References Cited

OTHER PUBLICATIONS

U.S. Appl. No. 14/798,717—Restriction Requirement dated Aug. 17, 2017.
U.S. Appl. No. 14/798,717—Non-Final Office Action dated Sep. 26, 2018.
U.S. Appl. No. 14/821,097—Restriction Requirement dated Jan. 4, 2016.
U.S. Appl. No. 14/821,097—Non-Final Office Action dated Jun. 28, 2016.
U.S. Appl. No. 14/821,097—Notice of Allowance dated Apr. 20, 2017.

* cited by examiner

PROCESS AND SYSTEMS FOR MOLDING THERMOSETTING PLASTICS

FIELD OF THE INVENTION

This invention relates to the field of molding thermosetting plastics, and particularly to the field of molding acrylic.

BACKGROUND OF THE INVENTION

Many products have been created from the use of molding thermosetting plastics. This process typically requires the mixing of monomer resins with a polyermization initiator in a chemical process to create a polymer. This process has more recently been utilized as part of a process to create such products as dentures.

Dentures have been manufactured for centuries to replace all or part of an individuals dentition. More recently, dentures have been manufactured by molding the denture from casts made of the patient's existing dentition. The manufacturing process begins with a preliminary impression of the patient's mouth, which is usually done in wax. This impression is used to prepare a diagnostic cast. While making the impression, the dentist applies pressure to the soft tissues to simulate biting force and extends the borders of the mold to adjacent toothless areas to allow the dentures to better adapt to the gums. A final cast is then formed from the diagnostic cast from gypsum. The final mold is filled acrylic resin to form the denture. The appropriate resin compound are then mixed in liquid form and packed into the mold. A vertical vise may be used to pack the resin compound. Alternatively the liquid acrylic compounds may be poured into the mold. The mold is then heated to initiate the chemical reaction to harden or cure the compound. Once the compound has cured, the mold is broken apart and the denture is removed. The denture is then fitted to the patient with minor revisions.

This process is time consuming and costly. Further, a number of problems may occur during the molding process, particularly with acrylic. These include shrinkage and porosity issues.

SUMMARY OF THE INVENTION

The present invention provides systems and processes for creating products from thermosetting plastics. The preferred embodiment allows molding of the thermosetting plastics while minimizing shrinkage and porosity during the curing process. The preferred embodiment also prevents leakage of the thermosetting plastic during the curing process as well. The preferred embodiment also minimizes clean up of the housing of the mold as well.

One preferred embodiment of the present invention provides a container for mixing the resins and initiator and for holding the mixed resins and initiator during the curing process. The upper edges of the container also provides a sealing mechanism in the mold housing to prevent leakage of the curing components.

The system of one preferred embodiment includes a housing having an inner cavity, a base attached to the housing and a piston slidable in the cavity. A container for mixing and holding the resins and initiator is placed in the cavity so that when the piston slides down to apply pressure against the mixed components, the upper edges of the container engage between the piston and housing to prevent leakage of the mixed components. Force applied against the piston creates pressure against the mixed components while heat is applied to the housing to initiate and control the curing process. The container may be deformable so that impressions may be formed in the final cured product.

The process for creating products from thermostatic plastics includes mixing the resins and initiator in a container, then placing the container in the cavity of a housing. Force is applied to a piston which slides into the cavity against the container. The upper edges of the container engage in the spacing between the piston and housing to seal the housing from leakage of the mixed components. The pressure from the piston and heat applied to the housing provide control of the curing process. Once the plastic has cured, the container can be removed from the housing and then removed from the cured product and discarded.

In a preferred embodiment of the present invention, the thermosetting plastic uses acrylic resins. An appropriate initiator can be selected to control the curing process.

In a preferred embodiment, the process and systems of the present invention are used to create a manufacturing blank. This blank is then used to fabricate a product, such as denture through CAD/CAM or other fabrication processes.

These and other features of the present invention will be evident from the ensuing detailed description of preferred embodiments, from the claims and from the drawings.

DETAILED DESCRIPTION OF PREFERRED EMBODIMENTS

Figure 1:
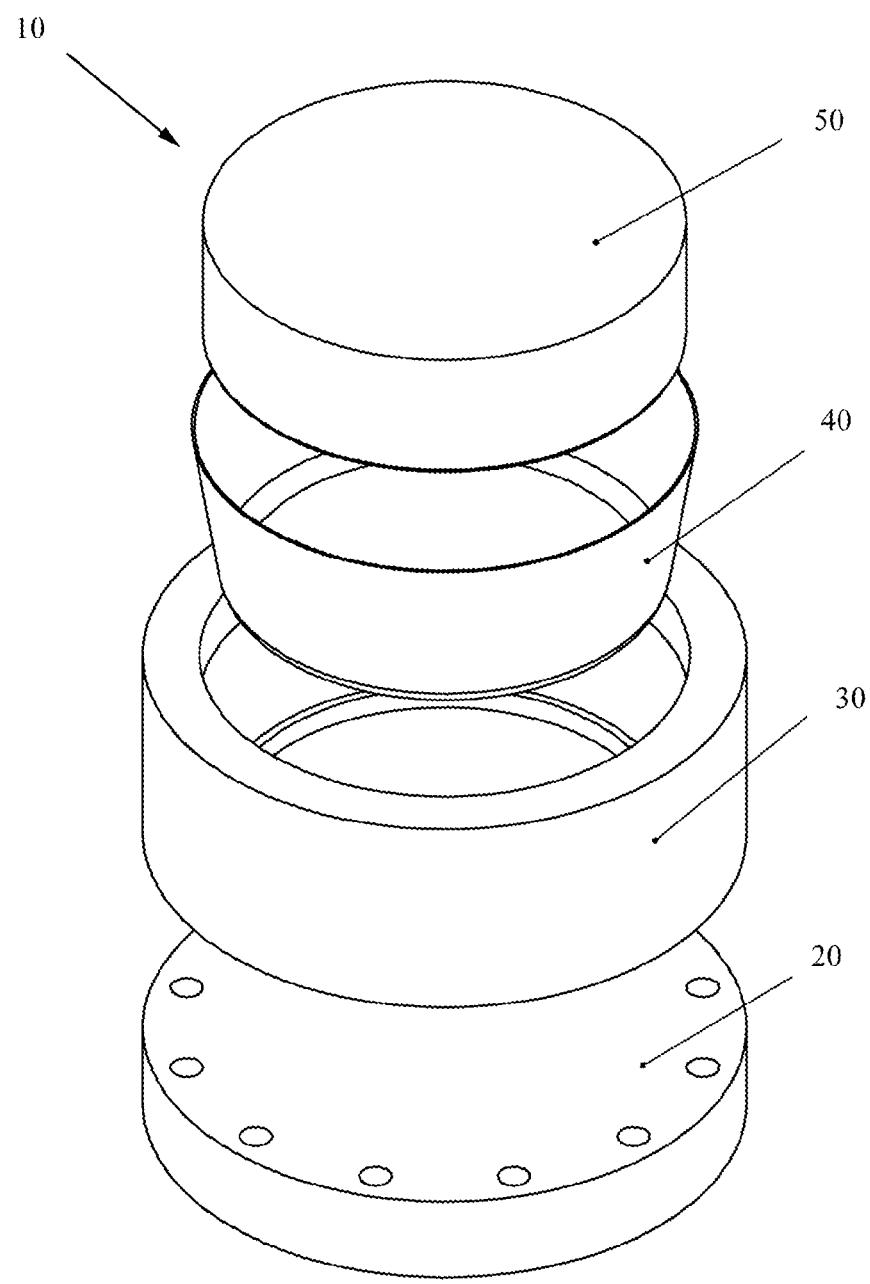
FIG. 1 is an exploded view of the system of a preferred embodiment of the present invention.
Figure 2:
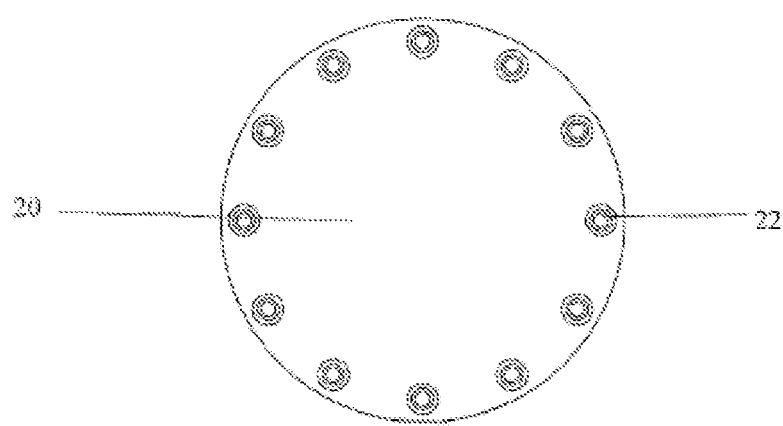
FIG. 2 is a bottom view of the system of FIG. 1.
Figure 3:
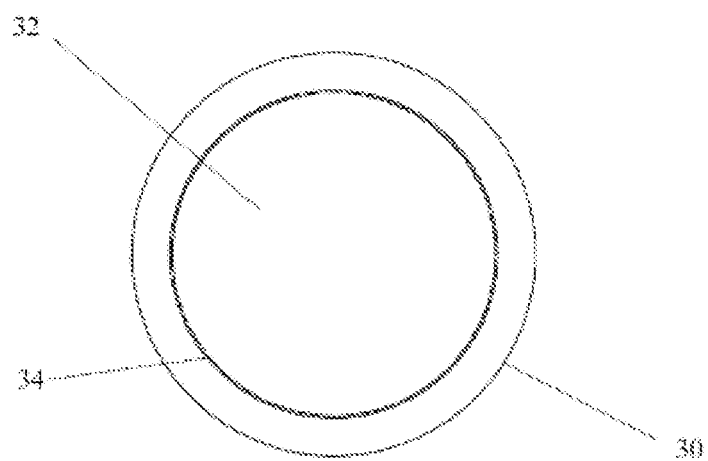
FIG. 3 is a top view of the system of FIG. 1.
Figure 4:
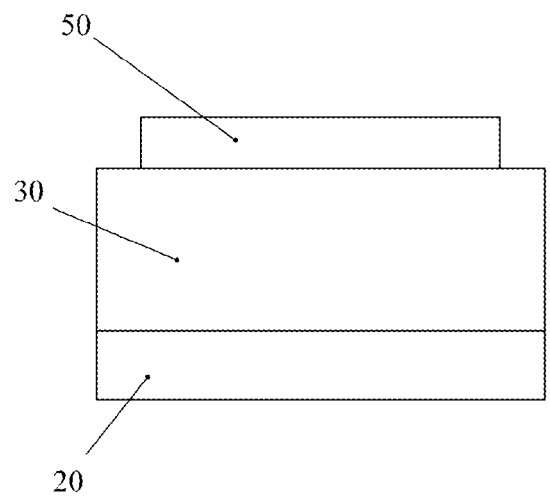
FIG. 4 is a view of the assembled system of FIG. 1.

The present invention provides systems and methods for manufacturing dentures, and more particularly, to the fabrication of the blank for the denture. It is to be expressly understood that this exemplary embodiment is provided for descriptive purposes only and is not meant to unduly limit the scope of the present inventive concept. Other embodiments and variations of the molding process and systems of the present invention are considered within the present inventive concept as set forth in the claims herein. Also, the present invention is primarily discussed for use with dentures for descriptive purposes only and is not meant to be limited solely to this use. It is to be expressly understood that other objects could be fabricated within the present invention as set forth in the claims.

Certain plastics are preferred for particular characteristics. An example of one such material is acrylic. Acrylic is a general term used for any one of the plastics generated through chemical reaction by applying a polymerization initiator and heat to a monomer resin. The monomer resin polyermizes to harden into a solid polymer material. These thermosetting plastics are formed from resins derived from acrylic acid, methacrylic acid or other related compounds. The chemical name for the resin produced from the methyl methacrylate monomer (MMA) is polymethyl methacrylate (PMMA). This particular material is highly durable, resistant to environmental factors and does not easily discolor.

The PMMA resin is mixed with a catalyst, hardener or initiator (collectively referred to as catalyst or initiator) to harden the plastic into a desired shape. The resin and catalyst are mixed together to form a liquid which can then be poured into a mold. The hardening or curing process begins once the two components, resin and catalyst, are mixed together to create a chemical process to form a hard polymer. Two important factors occur during the curing process that affect the final product. These factors are shrinkage of the combined components and heat.

While heat is necessary to initiate the curing process, the exothermic chemical process of curing also generates considerable heat. The exothermic process occurs from the center outward causing considerable temperature gradients and internal stresses. This generated heat can cause bubbles to form in the acrylic creating air porosity in the material. Additional air bubbles may occur due to the initial mixing of the two components and from pouring the liquid into the mold.

An additional problem with casting acrylics into molds is the shrinkage that occurs during the curing process. This shrinkage can range from eight percent to twenty one percent, thus is a significant factor in precisely forming an object from casting acrylic.

These factors are addressed by a number of techniques. These techniques include careful selection of the catalysts to control the exothermic process, utilization of vacuum chambers to remove air, multiple stages of heat application to control the heat of the curing process, and other techniques. One preferred technique is to apply pressure during the curing process. The use of high pressure on the resin and catalyst during the curing process will decrease the cooking of the acrylic during curing, decrease any thermal expansion during the curing, minimize any polymerization shrinkage, decrease the porosity of the acrylic by increasing the evaporation of the polymer and compressing air bubbles created during mixing. The pressure also compensates for the shrinkage factor.

System for Molding or Casting Acrylic

A preferred embodiment of a system for molding acrylic is illustrated in FIGS. 1-4. The system 10 includes a base 20 with housing 30 mounted thereon. Piston 50 slides within housing 30. A driving force, such as a mechanical force, hydraulic, pneumatic or other force application device (not shown) drives the piston 50 through the housing to create pressure within the housing. Cup 40 is mounted within the housing 30 to form a seal between the housing and piston.

The bottom 32 of the housing 30 is mounted to the base 20 by a series of spaced bolts securing the housing to the base as shown in FIGS. 2, 3, 4 and 5 to form a sealed container. The housing 30 is cylindrical with inner opening 32 forming a space for the cup 40, the combined resin and catalyst and the piston 50. A heating element (not shown) applies heat to the housing 30 to initiate the curing process. Temperature and pressure gauges may also be utilized in housing 30 along with ventilation openings to assist in controlling the curing process.

Figure 5:
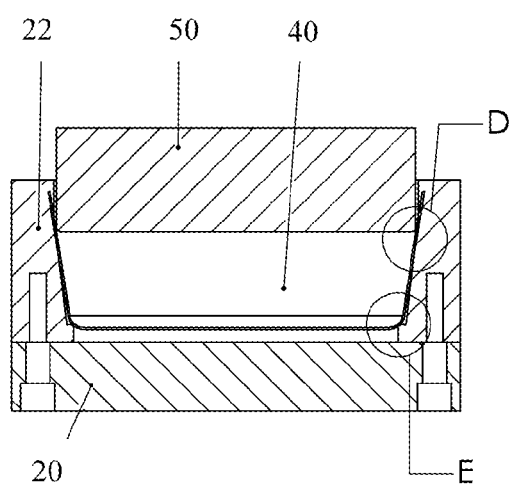
FIG. 5 is a cutaway view of the system of FIG. 1.
Figure 6:
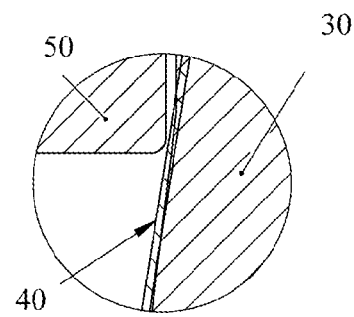
FIG. 6 is a detail view showing the area D of FIG. 5.

The resin and catalyst are mixed in cup 40 which is then placed within housing 30. Force is applied to piston 50 to apply pressure on the combined resin and catalyst. As shown in FIG. 5, the upper edges 42 of the cup 40 engage in the spacing between the housing 30 and piston 50 to form a seal to prevent leakage of the material. This is shown in greater detail in FIG. 6.

Figure 7:
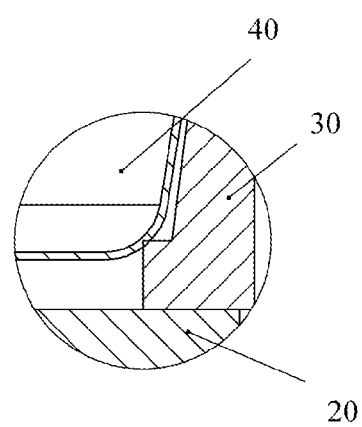
FIG. 7 is a detail view showing the area E of FIG. 5.

The cup 40 can also be used to create special impressions in the shape of the cured acrylic. For example, as shown in FIG. 7, the cup deforms under the pressure from the piston 50 to form a groove in the corner of the final product. Other impressions may be created as well as desired by the interaction of the cup and the housing.

The cup may be formed of plastic or other materials to be deformable under pressure or can be formed of more rigid materials to create a precise shape. The cup 40 also serves other purposes for the molding/casting process. The resin and catalyst can be carefully mixed in the cup which allows the cup to then be inserted into the housing. The cup also protects the housing 30 and base 20 from cured acrylic to minimize later clean-up.

Process of Molding Acrylic

The resins and catalysts are mixed together in the cup 40 to innate the curing process. The cup containing the combined components is then placed in the bottom of housing 40. Force is applied to piston 50 to apply pressure against the cup and combined components along with heat through the housing 30. The combined heat and pressure controls the curing process. The edges of the cup 40 engage between the piston 50 and the housing 40 to seal the housing to prevent leakage of the acrylic material. Once the acrylic has cured, the piston is retracted and the cured acrylic product is removed. The cup allows easy release of the product from the housing. The cup can then be removed from the cured product and discarded.

Applications

One application of the preferred embodiment of the present invention is to create precise blanks for manufacturing dentures. Blanks are formed using the above described system in the steps of the above described process to create manufacturing pucks. These pucks are then fabricated into dentures using CAD/CAM or other machining processes.

It is to be expressly understood that the above described embodiments are intended for explanatory purposes only and are not meant to limit the scope of the claimed inventions.

The invention claimed is:

1. A system for creating molded thermosetting plastic products, said system includes:
   a housing having an inner cavity;
   a base attached to the bottom of said housing;
   a piston slidable within said inner cavity of said housing; and
   a container for holding resins and initiator mixed together; said container engaging between said piston and said housing to create a seal between the housing and piston and prevent leakage of said mixed resins and initiator during a controlled curing process, the controlled curing process forming a cured dental material puck that may be extracted from the container.

2. The system of claim 1 wherein said container is formed of a rigid material.

3. The system of claim 1 wherein the portion of the container is formed of a deformable plastic.

4. The system of claim 1, wherein at least a portion of the container comprises:
   an edge of the container.

5. The system in claim 1, wherein the piston does not contact the housing.

6. The container in claim 1 wherein the container lacks a top side or a bottom side.

7. The system of claim 1, wherein at least a portion of the container comprises a deformable material to enable impressions to be created in said thermosetting plastic through the piston sliding into the housing.

8. A system for creating dental material puck, said system includes:
   a housing having an inner cavity;
   a base attached to the bottom of said housing;

a container for holding resins and initiator mixed together, the container configured to seat in the inner cavity of the housing and deform into the shape of the dental material puck.

9. The system of claim 8 further comprising a piston that may apply pressure into the container holding the resins and initiator mixed together, wherein an interaction between the container, piston and the base of the housing utilizes heat and pressure to create the dental material puck.

10. The system in claim 9, wherein dental material puck may further comprise a groove configured from the interaction.

11. The system in claim 10, wherein the groove is an annular groove.

12. The systems of claim 1 or 8 wherein said resins include: acrylic resins.

13. The system of claim 1 or 8, the container having curved aspects.

14. The system of claim 1 or 8, the container having linear aspects.

15. The system in claim 9, wherein the interaction does not include the piston contacting the housing or base.

16. The system in claim 8, wherein the container lacks a top side or a bottom side.

* * * * *